(12) United States Patent
Schenck et al.

(10) Patent No.: US 6,186,260 B1
(45) Date of Patent: Feb. 13, 2001

(54) ARM REST/SEAT SWITCH CIRCUIT CONFIGURATION FOR USE AS AN OPERATIONAL STATE SENSOR FOR A WORK MACHINE

(75) Inventors: Raymond T. Schenck, Sanford, NC (US); Steven T. Ufheil, East Peoria, IL (US)

(73) Assignee: Caterpillar S.A.R.L., Geneva (CH)

( * ) Notice: Under 35 U.S.C. 154(b), the term of this patent shall be extended for 0 days.

(21) Appl. No.: 09/169,497

(22) Filed: Oct. 9, 1998

(51) Int. Cl.$^7$ .................................................. B60K 23/04
(52) U.S. Cl. ........................................................... 180/273
(58) Field of Search ................................. 180/271, 268, 180/273, 272

(56) References Cited

U.S. PATENT DOCUMENTS

| | | | |
|---|---|---|---|
| 4,385,612 | 5/1983 | Masaki et al. ...................... 123/489 |
| 4,385,863 | 5/1983 | Minor .................................. 414/699 |
| 4,391,344 | 7/1983 | Weber et al. ....................... 180/271 |
| 4,480,713 | 11/1984 | Macht et al. ....................... 180/268 |
| 4,843,817 | 7/1989 | Shivvers et al. ...................... 60/487 |
| 4,844,196 | 7/1989 | Clevenger et al. ................. 180/273 |
| 4,856,612 | 8/1989 | Clevenger et al. ................. 180/273 |
| 4,871,044 | 10/1989 | Strosser et al. .................... 180/273 |
| 4,881,371 | 11/1989 | Haeder et al. ........................ 60/431 |
| 4,949,805 | 8/1990 | Mather et al. ...................... 180/333 |
| 5,046,311 | 9/1991 | Cartner ................................. 60/468 |
| 5,174,115 | 12/1992 | Jacobson et al. ..................... 60/484 |
| 5,203,440 | 4/1993 | Peterson et al. ................ 192/0.094 |
| 5,425,431 | * 6/1995 | Brandt et al. ...................... 180/273 |
| 5,577,876 | 11/1996 | Header et al. ...................... 414/699 |
| 5,590,731 | 1/1997 | Jacobson ........................... 180/53.4 |
| 5,711,391 | 1/1998 | Brandt et al. ..................... 180/273 |

\* cited by examiner

*Primary Examiner*—Paul N. Dickson
*Assistant Examiner*—Faye M. Fleming
(74) *Attorney, Agent, or Firm*—Blackwell Sanders Peper Martin

(57) ABSTRACT

An operational state sensor for controlling certain operations of a work machine such as a skid steer loader based upon the fulfillment of certain operator conditions, the operational state sensor including a first switch coupled to an operator restraint mechanism and actuatable between a first mode of operation corresponding to the condition when the operator restraint mechanism is in a non-restraining condition and a second mode of operation corresponding to the condition when the operator restraint mechanism is in a restraining condition, a second switch coupled to the operator seat and actuatable between a first mode of operation corresponding to the condition when an operator is not present in the seat and a second mode of operation corresponding to the condition when an operator is present in the seat, and an electronic controller coupled to the first and second switches for receiving signals therefrom, the controller being operable to receive a first signal indicative of when the first switch is either in or out of its first mode of operation and a second signal indicative of when the first and second switches are either concurrently in their second modes of operation or at least one of such switches is out of its second mode of operation, the controller being further operable to control the certain operations of the work machine based upon said first and second signals.

25 Claims, 4 Drawing Sheets

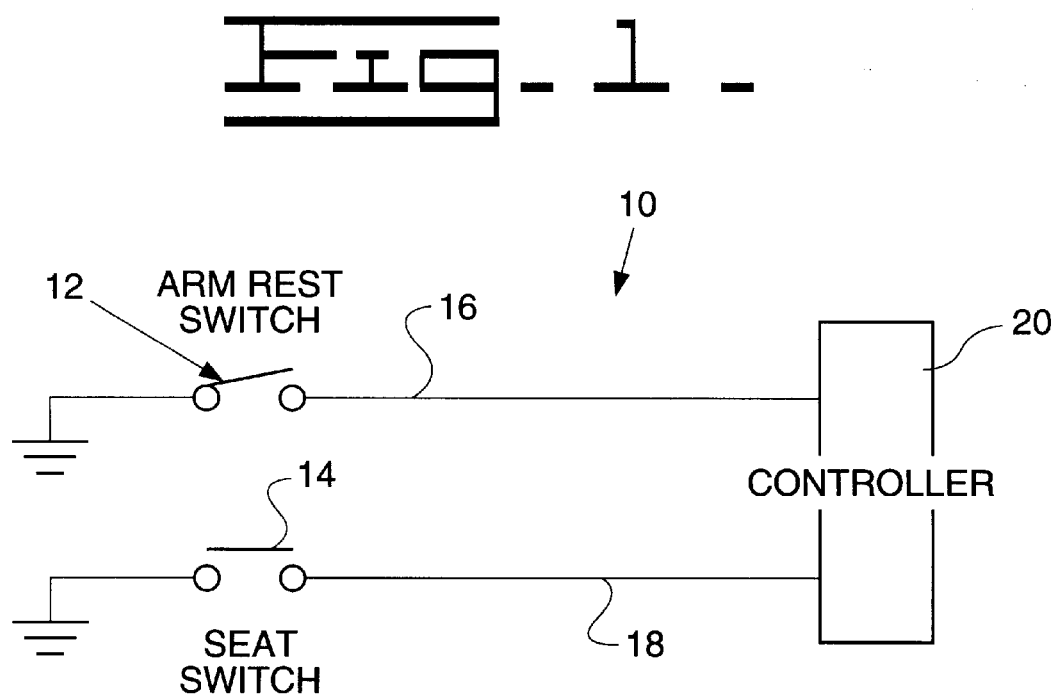
Fig-1-
PRIOR ART

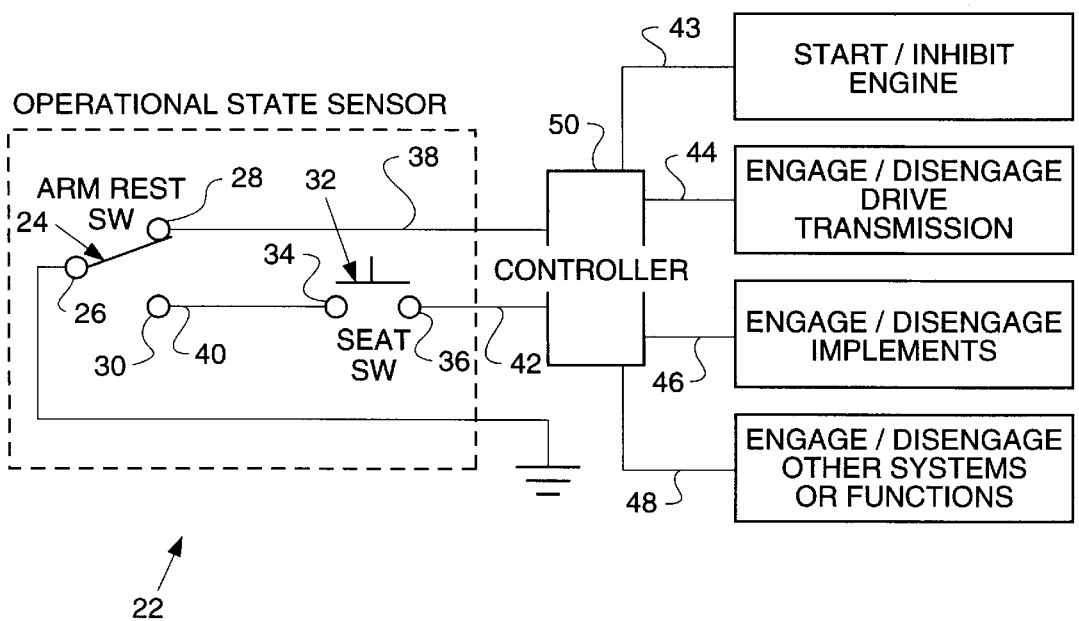
Fig-2-
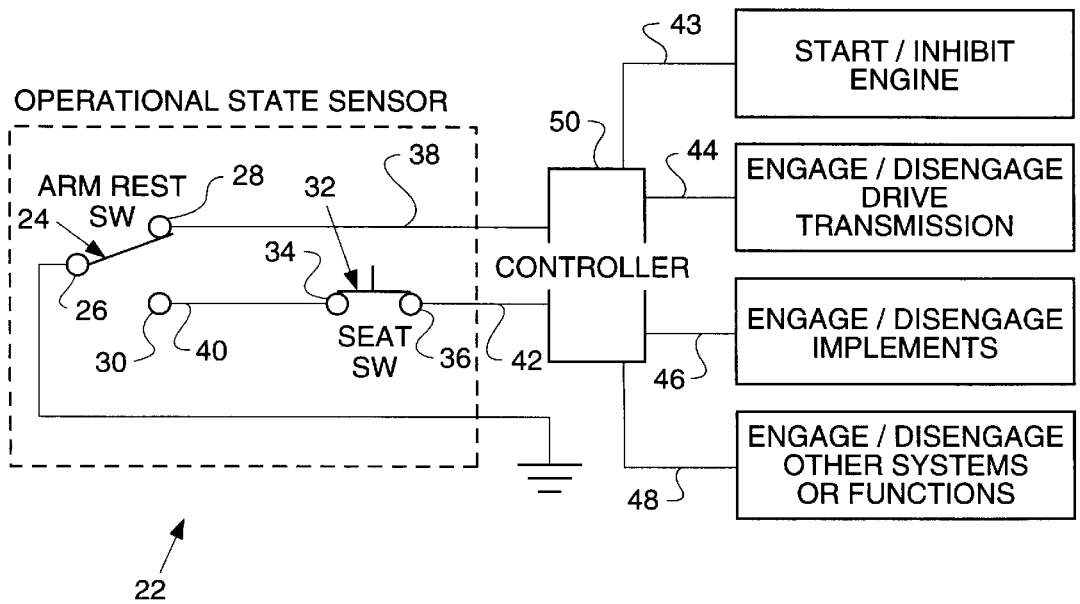
Fig-3-

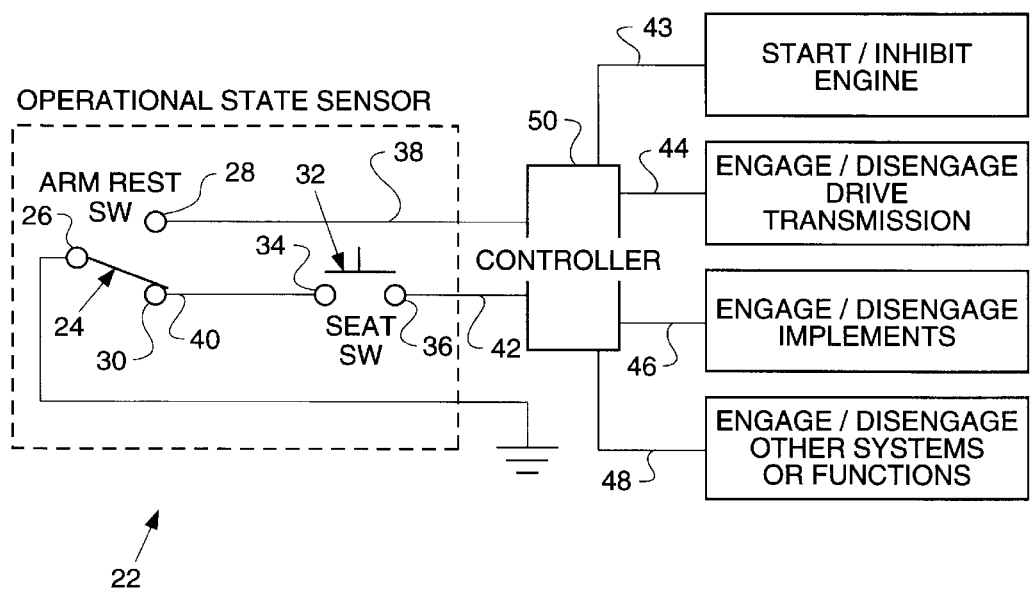
Fig-4-
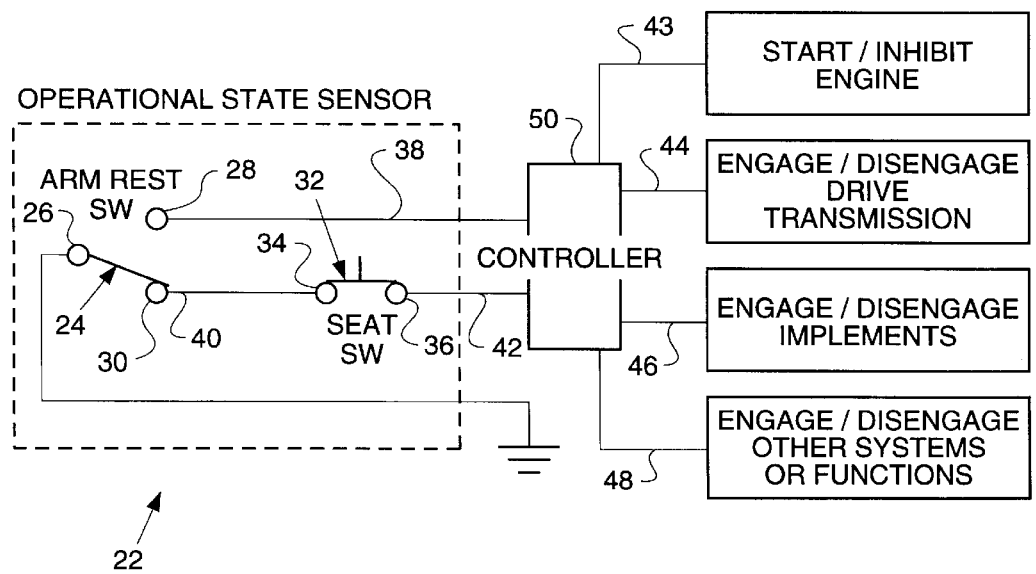
Fig-5-

ARM REST/SEAT SWITCH CIRCUIT CONFIGURATION FOR USE AS AN OPERATIONAL STATE SENSOR FOR A WORK MACHINE

TECHNICAL FIELD

This invention relates generally to arm rest and seat switches used as operational state sensors for work machines and, more particularly, to an arm rest/seat switch circuit configuration which enables an electronic controller to more accurately sense the proper parameters for enabling or disabling various machine systems and which yields a better logic combination for diagnostic purposes.

BACKGROUND ART

Arm rest and seat switches are commonly used as operational state sensors for work machines such as lawn tractors, skid steer loaders, integrated tool carriers, material handling machines, backhoe loaders and the like. As such, these switches are typically used to sense and detect when the machine operator is properly located in the machine prior to allowing movement thereof and/or enabling and/or disabling various systems associated with such machines. In the case of certain types of work machines such as a skid steer loader, from a safety standpoint, it is advantageous and necessary to ensure that the machine operator is, in fact, seated in the seat with the arm rest lowered to its operative or restraining position prior to starting the engine, and prior to engaging or activating the drive transmission, the implement lift and tilt mechanisms, and/or certain auxiliary hydraulic control systems and other functions. In these types of machines, such switches are commonly incorporated into an operator interlock control system whereby movement of the work machine and/or activation of some or all of the above-referenced systems are prevented unless certain operator safety parameters are met, namely, the operator is properly seated in the operator seat and the arm rest is down and in its restraining position. When so used, the operational state of the machine typically is detected by an arm rest/seat switch circuit configuration wherein the switches are coupled in a parallel arrangement to an electronic controller for sending input signals to such controller regarding the state or condition of such switches. A typical switch/sensor arrangement of this type is disclosed in U.S. Pat. No. 5,711,391 and is illustrated in FIG. 1.

Based upon input signals received from the arm rest and seat switches, the electronic controller will analyze such inputs and thereafter provide appropriate output signals to accomplish various tasks. Since arm rest and seat switches have been wired in parallel to electronic controllers used in work machines, such circuit configuration results in a single line input for each respective switch to the electronic controller. This is clearly illustrated in FIG. 1 wherein two independent switches 12 and 14 are coupled directly to an electronic controller 20, switch 12 representing the arm rest switch and switch 14 representing the seat switch. In this parallel switch arrangement, arm rest switch 12 is connected to controller 20 via conductive path 16 and seat switch 14 is connected to controller 20 via conductive path 18. In this particular circuit arrangement, latent faults in the circuit that result in normal operation will go undetected. For example, referring to FIG. 1, shorts to ground or open circuits on either the arm rest switch 12 or the seat switch 14 will go undetected as these failures look like a normal operating condition to controller 20. More particularly, a short to ground on arm rest switch 12 will look to controller 20 as if switch 12 is closed thereby indicating that the arm rest is down and the machine is safe to operate regardless of the actual state or position of the arm rest. Similarly, an open circuit on switch 12 will look to controller 20 as if the arm rest is always up and the seat switch 14 failing in its closed position will appear to controller 20 as though the machine operator is properly positioned in the seat.

As a result, the prior art circuit configuration 10 does not always identify certain failures and when certain faults are diagnostically recognized, it is often times difficult to determine if a switch has failed or if a failure has occurred in the wiring harness such as conductive paths 16 and 18. Additional troubleshooting of the system and circuit must therefore be accomplished in order to further isolate and detect the particular failure which has occurred, which additional action increases costs and machine downtime.

Improved diagnostic capability is therefore desirable. It is also desirable to build some redundancy into the arm rest/seat switch circuit configuration such that the input signals received from these switches are somehow tied together so as to give a better indication to the electronic controller that the operator is in fact properly located in the machine seat with the arm rest in its down and operative position.

Accordingly, the present invention is directed to overcoming one or more of the problems as set forth above.

DISCLOSURE OF THE INVENTION

In accordance with the teachings of the present invention, an arm rest/seat switch control circuit is disclosed wherein the arm rest and seat switches are wired or coupled in series such that the switch signals inputted to the electronic controller are tied together in a particular manner. Although different types of switches can be utilized with the present invention, the arm rest switch is preferably a proximity switch actuated by the lowering and raising of the arm rest and the seat switch is preferably a pressure actuated momentary switch that closes when the machine operator is seated in the seat. In the preferred embodiment, the arm rest switch is a noncontacting single pole, double throw reed switch which is actuated by a magnet. The magnet is preferably located on the arm rest and as the arm rest is moved between its up and down positions, the magnet comes in proximity to the switch and moves the switch from a first state or contact position to a second state or contact position.

During normal operation, when the arm rest is in its up position, the arm rest switch is normally closed against a first contact point thereby providing a first set of normally closed contacts and this state or condition is coupled or tied directly to the electronic controller such that the controller will sense both the normally closed and open positions of this first set of contacts. The second set of normally open contacts associated with the arm rest switch are wired in series to the seat switch which, in turn, is coupled or tied directly to the electronic controller. During normal operation, with the arm rest in its up position, the signal to the seat switch is open. On the other hand, when the arm rest is lowered into its operative down position and the operator is properly positioned within the seat, the arm rest signal from the first set of contacts to the electronic controller is open and the arm rest signal from the second set of contacts to the seat switch and then to the electronic controller is closed. As a result, the electronic controller will read both states of the arm rest switch and will continuously detect whether the arm rest is in its up position, but will only detect the arm rest in its down position when the operator is, in fact, positioned in the machine seat.

Because the electronic controller senses both states of the arm rest switch, the electronic controller will be better able to determine the proper operator parameters for machine and systems operation and the controller will be better able to perform diagnostics on the switches in order to detect and determine latent faults in the circuit configuration through the normal course of operation and thereafter take appropriate action. This circuit configuration therefore improves the programmable diagnostic capabilities of the controller and likewise improves the controller's ability to better determine the proper operator parameters for normal operating conditions.

It is also recognized that other types of arm rest/seat switches can likewise be utilized in the present invention to tie the arm rest and seat switch signals together. In this regard, a double pole single throw switch could be utilized as well as other switch configurations including other proximity switch configurations. It is also recognized that the present circuit configuration is adaptable for use with other operator restraint mechanisms such as a seat belt or shoulder harness mechanism as compared to the use of an arm bar or arm rest device.

The present arm rest/seat switch circuit configuration can be incorporated into any work machine in accordance with the teachings of the present invention.

BRIEF DESCRIPTION OF THE DRAWINGS

For a better understanding of the present invention, reference may be made to the accompanying drawings in which:

FIG. 1 is a schematic diagram of a prior art arm rest/seat switch circuit configuration;

FIG. 2 is a schematic diagram of an arm rest/seat switch circuit configuration constructed in accordance with the teachings of the present invention;

FIG. 3 is a schematic diagram of the circuit configuration of FIG. 2 illustrating the condition when the arm rest is in its up position and an operator is present in the seat;

FIG. 4 is a schematic diagram of the circuit configuration of FIG. 2 illustrating the condition when the arm rest is in its down position and no operator is present in the seat;

FIG. 5 is a schematic diagram of the circuit configuration of FIG. 2 illustrating the condition when the arm rest is in its down position and an operator is present in the seat.

BEST MODE FOR CARRYING OUT THE INVENTION

Figure 6:
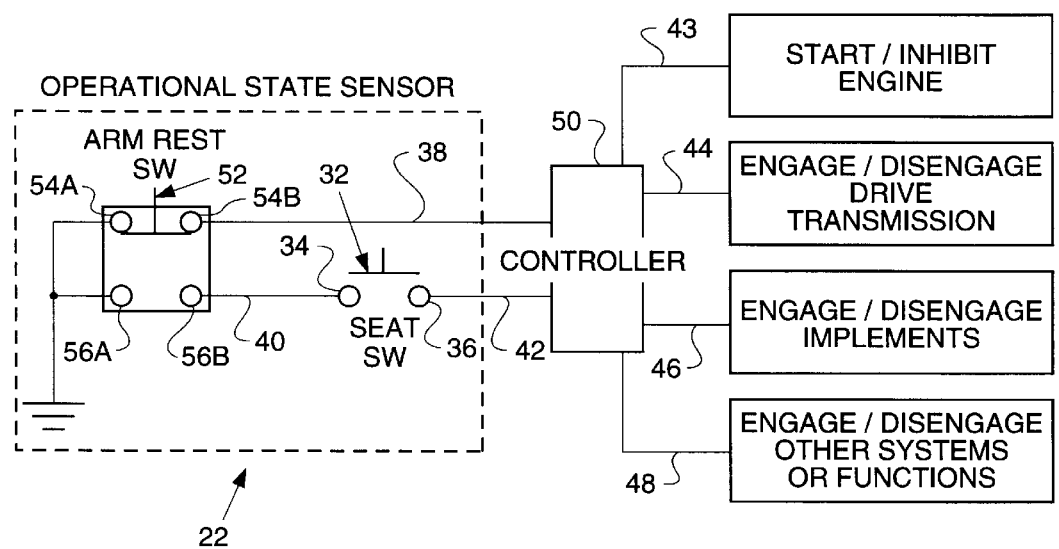
FIG. 6 is a schematic diagram of an alternative embodiment of the arm rest/seat switch circuit configuration constructed in accordance with the teachings of the present invention.

Referring to the drawings, numeral 10 in FIG. 1 illustrates a typical arm rest/seat switch circuit configuration utilized in existing work machines as previously explained above.

Referring to FIG. 2, numeral 22 in FIG. 2 represents a preferred embodiment of the arm rest/seat switch circuit configuration of the present invention, this switch arrangement 22 comprising the operational state sensor for a particular work machine such as a skid steer loader. More particularly, operational state sensor 22 includes arm rest switch 24 and seat switch 32 coupled to an electronic control module (ECM) 50 in the following manner. In this embodiment, arm rest switch 24 is a non-contacting proximity switch which comprises a single pole 26, double throw reed switch having contacts 28 and 30 which are activated by a magnet (not shown). As the magnet passes in proximity to reed switch 24, the switch changes states thereby changing the signal output. In a particular work machine such as a skid steer loader, the arm rest switch 24 and its harness can be packaged and mounted to a rear mounting bracket associated with the arm rest mechanism. The magnet itself can be positioned and located on the arm rest itself such that when the arm rest is moved back and forth between its up or out-of-the-way position and its down or operative restraint position, the magnet will come in proximity to the switch 24 thereby changing the state of the switch contacts. The use of a non-contacting proximity switch for the arm rest switch is advantageous because it provides a reliable means of sensing the position of the arm rest with minimal moving parts, without making switch adjustments, and with minimal wear and tear on the particular switch mechanism. This is true because many of the components associated with this type of proximity switch do not contact one another thereby substantially reducing wear and tear on such components. In addition, there is no adjustment required as is typically necessary with limit switches. Still further, this type of switch will also work with a buildup of debris between the magnet and the reed switch, a substantial benefit considering the operating environment in which work machines such as skid steer loaders must constantly operate. Although the single pole, double throw reed switch illustrated in FIG. 2 is generally preferred, it is also recognized and anticipated that other types of proximity switches as well as non-proximity switches may likewise be utilized in place of switch 24 without departing from the spirit and scope of the present invention.

In the FIG. 2 embodiment, the arm rest switch 24 is in a normally closed position against contact 28 when the arm rest is in its up position, pole 26 and contact 28 thereby providing a first set of normally closed contacts. Contact 28 is connected to ECM 50 via conductive path 38 such that ECM 50 will constantly sense and detect the arm rest up position. As shown in FIG. 2, the signal from arm rest switch 24 via conductive path 38 is closed or grounded. On the other hand, seat switch 32 is a pressure actuated momentary switch that is normally open as shown in FIG. 2 and closes when the operator is seated in the seat. In this regard, contact 30 of arm rest switch 24 is connected in series via conductive path 40 to contact 34 of seat switch 32, and contact 36 of switch 32 is connected directly to ECM 50 via conductive path 42. When the arm rest is moved to its down or operative position, switch 24 will be moved away from its normally closed position against contact 28 as shown in FIG. 2 and into electrical contact with contact 30 as shown in FIGS. 4 and 5. Here, pole 26 and contact 30 provide a second set of normally open contacts. When the machine operator is seated in the seat, seat switch 32 will be moved to its closed position thereby completing the circuit via conductive paths 40 and 42 to the ECM 50 as shown in FIG. 5. In the FIG. 5 circuit diagram, the signal from arm rest switch 24 via conductive path 38 to ECM 50 is open and the signal from the seat switch 32 to ECM 50 is closed or grounded.

Because of this particular circuit configuration, ECM 50 will only sense the arm rest down position when the operator is seated in the seat. The controller 50 does not sense any presence of the operator in the seat until the arm rest is moved to its down position and switch 24 is moved into electrical contact with contact 30. If the operator is seated in the seat and the arm rest remains in the up position, contact 30 will remain open and an open signal is sensed by controller 50 (FIG. 3). Since both states of the arm rest switch 24 are sensed by ECM 50, these two signals inputted to ECM 50 will enable ECM 50 to be programmed so as to more accurately determine when the operator is positioned in the seat with the arm rest down so that other systems and functions can be accessed. In addition, such a circuit arrangement also allows a better logic combination to be programmed into ECM 50 for diagnostic purposes so as to enable ECM 50 to perform better diagnostics on the overall circuit as well as the operability of switches 24 and 32.

Electronic controllers or modules such as ECM 50 are commonly used in association with work machines for accomplishing various tasks. ECM 50 will typically include processing means, such as a microcontroller or microprocessor, associated electronic circuitry such as input/output circuitry, analog circuits or programmed logic arrays, as well as associated memory. ECM 50 can therefore be programmed to sense and recognize the below-discussed detected conditions of operational state sensor 22 and, based upon such sensed conditions, ECM 50 will provide appropriate output signals to accomplish certain tasks such as those tasks indicated in FIGS. 2–6. The present circuit configuration would operate in conjunction with a typical interlock control system in the following manner.

ECM 50 will sense and analyze inputs from switches 24 and 32 and make a determination based upon such inputs as to whether certain operations will be allowed. Referring to FIG. 2, if the arm rest is in the up position and no operator is in the machine seat, and ECM 50 is powered up, conductive path 38 will be closed whereas conductive paths 40 and 42 will be open. This particular combination of signal inputs to ECM 50 from switches 24 and 32 indicate a nonoperative condition and, based upon these inputs, ECM 50 would be programmed, for example, so as to inhibit the starting of the engine, or if the engine is already running, to disable or deactivate the drive transmission, and/or various implement mechanisms, and/or other systems or machine functions. Such signals or commands to accomplish these tasks will be outputted via conductive paths 43, 44, 46 and/or 48, or some other conductive path arrangement, depending upon the particular systems associated with the work machine, the wiring, output circuitry or programming of ECM 50, as well as the activation of any override systems.

FIG. 3 represents the position of the switches 24 and 32 when an operator is positioned in the seat with the arm rest in its up position. In this particular situation, with ECM 50 powered up, conductive path 38 will again be closed and although the seat switch is in its closed position, conductive paths 40 and 42 will remain open. This particular combination of signal inputs to ECM 50 from switches 24 and 32 is identical to that explained with respect to FIG. 2 and indicates a non-operative condition. Here again, ECM 50 would be programmed so as to inhibit the starting of the engine, or if the engine is already running, to disable the drive transmission, and/or various implement mechanisms, or other systems and/or functions by outputting at least one signal such as the signals outputted via conductive paths 43, 44, 46 and/or 48 as previously explained.

FIG. 4 represents the position of switches 24 and 32 where the arm rest of the machine has been lowered to its down or operative position, but the operator is not seated in the seat. In this particular situation, with ECM 50 powered up, conductive paths 38 and 42 will both be open. This particular combination of signal inputs to ECM 50 again indicates a non-operative condition and ECM 50 would be programmed as previously explained with respect to FIGS. 2 and 3.

FIG. 5 represents the position of switches 24 and 32 when the operator is properly positioned in the machine seat with the arm rest in its down and operative position. In this particular situation, with ECM 50 powered up, conductive path 38 will be open and conductive paths 40 and 42 will be closed. This particular combination of signal inputs to ECM 50 from switches 24 and 32 indicates a normal operative run condition and ECM 50 would be programmed to allow the operator to start the engine and thereafter enable or engage the drive transmission, the implement mechanisms, and/or other systems or functions, or if the engine is already running, to again activate such mechanisms. Here again, such signals or commands from ECM 50 to accomplish these various tasks can be outputted via conductive paths 43, 44, 46 and/or 48 as previously explained.

FIGS. 2–5 therefore represent the various combination of switch positions associated with the present operational state sensor 22 which can occur during normal machine operation without any faults or circuit malfunctions occurring in the present circuit configuration. System diagnostics and various fault scenarios will be hereinafter discussed.

FIG. 6 illustrates the use of another type of proximity switch which may be utilized in place of arm rest switch 24. In the circuit configuration of FIG. 6, arm rest switch 52 comprises a double pole, single throw switch connected in essentially the same manner to seat switch 32 and ECM 50 as previously explained with respect to the circuit configurations illustrated and discussed in FIGS. 2–5. Switch 52 can again be activated by a magnet as previously explained, or by some other proximity means. Switch 52 includes paired contacts 54A, 54B and 56A, 56B. Similar to arm rest switch 24, switch 52 is in a normally closed position against contacts 54A and 54B when the arm rest is in its up position, contact 54B being connected to ECM 50 via conductive path 38. Similar to the circuit configuration 22, ECM 50 will constantly sense the arm rest up position. On the other hand, when the arm rest is lowered to its down and operative position, switch 52 will be moved into electrical contact with contacts 56A and 56B thereby completing the circuit via conductive paths 40 and 42 when seat switch 32 is moved to its closed position as previously explained. In all other respects, switch 52 operates in a similar fashion to switch 24. Again, both states of arm rest switch 52 are sensed by ECM 50 and when these two signals are inputted to ECM 50, ECM 50 will function and operate as previously explained.

It is recognized and anticipated that still other types of arm rest switches as well as other types of seat switches can be utilized in conjunction with the present invention so long as such switches are configured such that ECM 50 will be able to continuously monitor and sense the arm rest up position, but will only sense the arm rest down position when the machine operator is positioned in the seat.

It is also recognized and anticipated that other types of operator restraint systems may be used in place of the arm rest system discussed above. For example, a seat belt or shoulder harness arrangement may be used. In this situation, it is recognized that the arm rest switches 24 and 52 illustrated in the present circuit configuration shown in FIGS. 2–6 can be adapted for use with other restraint mechanisms such as a seat belt or shoulder harness by wiring or otherwise coupling such switches to such other mechanisms such that conductive path 38 will continuously monitor when, for example, the seat belt or shoulder harness is unlocked or unbuckled, and conductive paths 40 and 42 will monitor when the seat belt or shoulder harness is in its locked or buckled condition and the operator is present in the seat. Other restraint systems are equally adaptable for use with the present circuit configuration.

Regardless of the different types of arm rest and seat switches utilized in conjunction with the present invention, and regardless of the particular type of operator restraint system incorporated into the work machine, the present arm rest/seat switch circuit configuration enables ECM 50 to be coupled to such switches so as to be operable to receive a first signal indicative of when the arm rest switch is either in or out of its first state or first mode of operation, and a second signal indicative of when the arm rest and seat switches are either concurrently in their second state or second mode of operation, or at least one of such switches is out of or is not in its second mode of operation. Based upon the signals received from the arm rest and seat switches, ECM 50 is further operable to control certain operations of the work machine by outputting at least one signal to either activate, deactivate, and/or inhibit certain operations of the work machine as previously explained.

INDUSTRIAL APPLICABILITY

As described herein, use of the present arm rest/seat circuit configuration as illustrated in FIGS. 2–6 enhances the capabilities of ECM 50 to better determine the proper operational parameters for the particular machine. This circuit configuration has particular utility when used as an operational state sensor for work machines such as lawn tractors, skid steer loaders, and other small and large machines of this type. The present circuit configuration is particularly adaptable for use in an operator interlock control system commonly associated with the above-mentioned work machines to enable and/or disable various machine systems and functions as previously explained.

Still further, the present circuit configuration greatly enhances the diagnostic capabilities of the electronic controller coupled thereto. More particularly, the present circuit configuration provides increased benefit in that faults in the circuit are detected when they occur and, importantly, latent faults that result in normal operation indications will not go undetected. This improves the overall operational safety of the machine since the tied input signals from the arm rest and seat switches will better enable the electronic controller to sense and evaluate the input signals and make a determination as to whether certain operations or functions will be allowed. In the case of open circuits or shorts to ground in association with the present circuit configuration, ECM 50 can be programmed to detect the fault through the course of normal operation and thereafter take the necessary action. For example, referring again to FIGS. 2 and 5, if the signal line or conductive path 38 from the arm rest switch 24 to ECM 50 is shorted to ground, ECM 50 will detect what appears to be a normal condition with the arm rest up, but ECM 50 will sense both input lines or paths 38 and 40, 42 grounded when the arm rest is lowered to its operative position and the operator is present in the seat. Since this is not one of the normal operating states for the machine, ECM 50 will be programmed to detect this condition as a fault condition and thereafter take any necessary actions such as disabling or deactivating the drive transmission and implement systems associated with the machine if such systems are in use at the time the fault is detected. In addition, this same fault condition will occur if the arm rest is in its up position and the signal line or path from the seat switch to ECM 50 is shorted to ground. Here again, this fault condition will be sensed by ECM 50 and appropriate action can be taken. In such an event, ECM 50 can also output a signal triggering some type of visual and/or auditory warning to the operator compartment to indicate that a system problem exists.

Referring again to FIG. 4, this operating state will occur when the arm rest is in its down position but the operator is not seated in the seat. As previously explained, when this occurs, ECM 50 will detect both inputs via conductive paths 38 and 42 open. Although this operating state can normally occur when the operator is outside of the operator compartment, such an operating state is typically not considered normal since it is extremely difficult for an operator to leave the seat of the machine without first moving the arm rest to its up and out of the way position. As a result, ECM 50 can be programmed to recognize this particular state, that is, an open circuit on both inputs from the arm rest switch, as a fault condition. In this particular case, when such state is sensed by ECM 50, several circuit failure possibilities may exist. For example, such a condition can be sensed if (1) the arm rest is in its up position but an open circuit exists along conductive path 38; or (2) the arm rest is in its down position with the operator seated in the seat and an open circuit exists along conductive paths 40 and/or 42; or (3) the arm rest switch has failed and no electrical contact is made with either contact points 28 and 30. ECM 50 can be programmed with this logic combination so as to disable operation of the particular machine and other systems or functions associated therewith when this condition is detected and ECM 50 can likewise activate some type of warning device in the operator compartment to alert the operator to the problem condition. Additional programming and/or troubleshooting procedures can be implemented to further isolate the circuit failure based upon the above-discussed possibilities including step-by-step instructions for troubleshooting each circuit component and wiring. In this regard, it is desirable that ECM 50 and the associated circuit and connectors be located on the machine in such a manner as to facility servicing.

Other aspects, objects and advantages of the present invention can be obtained from a study of the drawings, the disclosure and the appended claims.

What is claimed is:

1. A control circuit for controlling certain operations of a work machine based upon the fulfillment of certain operator conditions, said control circuit comprising:

a first switch operable between a first mode of operation corresponding to a condition when a first operator condition is not fulfilled and a second mode of operation corresponding to a condition when the first operator condition is fulfilled;

a second switch operable between a first mode of operation corresponding to a condition when a second operator condition is not fulfilled and a second mode of operation corresponding to a condition when the second operator condition is fulfilled; and an electronic controller coupled to said first and second switches for receiving signals therefrom, said controller being operable to receive a first signal indicative of when said first switch is either in its first mode of operation or said first switch is not in its first mode of operation and a second signal indicative of when said first and second switches are either concurrently in their second modes of operation or at least one of said first and second switches is not in its second mode of operation;

said first signal being grounded when said first switch is in its first mode of operation, and said second signal being grounded when said first and second switches are concurrently in their second modes of operation, said controller being further operable to control the certain operations of the work machine based upon said first and second signals.

2. The control circuit, as set forth in claim 1, wherein the work machine includes an arm rest and a seat for an operator to be positioned thereon, said arm rest being movable between an up position and a down position, said first operator condition corresponding to the position of the arm rest such that when said arm rest is in its up position said first operator condition is unfulfilled and when said arm rest is in its down position said first operator condition is fulfilled, and said second operator condition corresponding to the operator's position relative to the seat such that when the operator is not positioned in the seat said second operator condition is unfulfilled and when the operator is positioned in the seat said second operator condition is fulfilled.

3. The control circuit, as set forth in claim 1, wherein said controller outputs at least one signal to activate certain operations of the work machine when said controller receives a signal indicative of said first switch not being in its first mode of operation and a signal indicative of said first and second switches being concurrently in their second modes of operation.

4. The control circuit, as set forth in claim 1, wherein said controller outputs at least one signal to deactivate certain operations of the work machine when said controller receives a signal indicative of at least one of said first and second switches not being in its second mode of operation.

5. The control circuit, as set forth in claim 1, wherein said controller outputs at least one signal to deactivate certain operations of the work machine when said controller receives a signal indicative of said first switch being in its first mode of operation.

6. The control circuit, as set forth in claim 1, wherein the work machine includes an arm rest and an operator seat, said arm rest being movable between an up position and a down position, said first switch being coupled to said arm rest and said second switch being coupled to said seat.

7. The control circuit, as set forth in claim 6, wherein the work machine is a skid steer loader.

8. The control circuit, as set forth in claim 6, wherein the first mode of operation of said first switch corresponds to the condition when said arm rest is in its up position and the second mode of operation of said first switch corresponds to the condition when said arm rest is in its down position, and wherein the first mode of operation of said second switch corresponds to the condition when no operator is present in the seat and the second mode of operation of said second switch corresponds to the condition when an operator is present in the seat.

9. The control circuit, as set forth in claim 6, wherein said first switch is a non-contacting proximity switch.

10. The control circuit, as set forth in claim 6, wherein said second switch is a pressure actuated momentary switch.

11. The control circuit, as defined in claim 1, wherein the work machine includes an engine and wherein the certain operations of the work machine controllable by said control circuit includes starting and inhibiting the starting of the engine.

12. The control circuit, as set forth in claim 1, wherein the work machine includes a drive transmission and the certain operations of the work machine controllable by said control circuit includes activating and deactivating the drive transmission.

13. The control circuit, as set forth in claim 1, wherein the work machine includes an implement system and the certain operations of the work machine controllable by said control circuit includes activating and deactivating the implement system.

14. An operational state sensor for controlling certain operations of a work machine wherein the work machine includes an engine, an operator restraint mechanism and an operator seat, said operational state sensor comprising:

a first switch coupled to said operator restraint mechanism and actuatable between a first state corresponding to the condition when said operator restraint mechanism is in a non-restraining condition and a second state corresponding to the condition when said operator restraint mechanism is in a restraining condition;

a second switch coupled to said operator seat and actuatable between a first state corresponding to the condition when an operator is not present in the seat and a second state corresponding to the condition when an operator is present in the seat;

an electronic controller coupled to said first and second switches and operable to receive signals from each of said switches, said signals being indicative of the states of each switch;

said controller outputting a signal to enable certain operations of the work machine when said controller receives a signal indicative of said first switch being out of its first state and a signal indicative of said first and second switches being concurrently in their second state.

15. The operational state sensor, as set forth in claim 14, wherein said operator restraint mechanism includes an arm rest movable between an up position and a down position, said up position corresponding to the non-restraining condition and said down position corresponding to the restraining condition.

16. The operational state sensor, as set forth in claim 14, wherein the work machine includes a drive transmission and the certain operations of the work machine controllable by said operational state sensor includes the drive transmission.

17. The operational state sensor, as set forth in claim 14, wherein the work machine includes an implement system and the certain operations of the work machine controllable by said operational state sensor includes the implement system.

18. The operational state sensor, as set forth in claim 14, wherein the certain operations of the work machine controllable by said operational state sensor includes starting the engine.

19. An operational state sensor for controlling certain operations of a work machine wherein the work machine includes an engine, an operator restraint mechanism and an operator seat, said operational state sensor comprising:

a first switch coupled to said operator restraint mechanism and actuatable between a first state corresponding to the condition when said operator restraint mechanism is in a non-restraining condition and a second state corresponding to the condition when said operator restraint mechanism is in a restraining condition;

a second switch coupled to said operator seat and actuatable between a first state corresponding to the condition when an operator is not present in the seat and a second state corresponding to the condition when an operator is present in the seat;

an electronic controller coupled to said first and second switches and operable to receive first and second signals from said switches, said first signal being indicative of when said first switch is either in or out of its first state and said second signal being indicative of when said first and second switches are either concurrently in or at least one of said switches is out of their respective second states;

said first signal being grounded when said first switch is in its first state, and said second signal being grounded when said first and second switches are concurrently in their second states;

said controller outputting a signal to disable or inhibit certain operations of the work machine when said second signal indicates that either said first or second switch is out of its second state.

20. The operational state sensor, as set forth in claim 19, wherein the certain operations of the work machine controllable by said operational state sensor includes inhibiting the start of the engine.

21. The operational state sensor, as set forth in claim 19, wherein the work machine includes a drive transmission and the certain operations of the work machine controllable by said operational state sensor includes disabling or inhibiting the operation of the drive transmission.

22. The operational state sensor, as set forth in claim 19, wherein the work machine includes an implement system and the certain operations of the work machine controllable by said operational state sensor includes disabling or inhibiting the operation of the implement system.

23. An operational state sensor for controlling certain operations of a work machine wherein the work machine includes an engine, an operator restraint mechanism and an operator seat, said operational state sensor comprising:

a first switch coupled to said operator restraint mechanism and actuatable between a first state corresponding to the condition when said operator restraint mechanism is in a non-restraining condition and a second state corresponding to the condition when said operator restraint mechanism is in a restraining condition;

a second switch coupled to said operator seat and actuatable between a first state corresponding to the condition when an operator is not present in the seat and a second state corresponding to the condition when an operator is present in the seat;

an electronic controller coupled to said first and second switches and operable to receive first and second signals from said switches, said first signal being indicative of when said first switch is either in or out of its first state and said second signal being indicative of when said first and second switches are either concurrently in their respective second states or at least one of said first and second switches is out of its second state;

said controller outputting at least one signal to disable or inhibit certain operations of the work machine when said first signal indicates that said first switch is in its first state.

24. A control circuit for controlling certain operations of a work machine wherein the work machine includes an arm rest and an operator seat, said arm rest being movable between an up position and a down position, said control circuit comprising:

an arm rest switch;

a seat switch coupled in series with said arm rest switch;

a controller coupled to said arm rest and seat switches;

said arm rest switch being operable between a first mode of operation corresponding to said arm rest being in its up position and a second mode of operation corresponding to said arm rest being in its down position;

said seat switch being operable between a first mode of operation corresponding to no operator being seated in the seat and a second mode of operation corresponding to an operator being seated in the seat; and said controller sensing both the first and second modes of operation of said arm rest switch, said first mode of operation of said arm rest switch being sensed continuously while the second mode of operation of said arm rest switch is only sensed when said seat switch is in its second mode of operation.

25. An operational state sensor for controlling certain operations of a work machine wherein the work machine includes an engine, an operator restraint mechanism and an operator seat, said operational state sensor comprising:

a first switch coupled to said operator restraint mechanism and actuatable between a first state corresponding to the condition when said operator restraint mechanism is in a non-restraining condition and a second state corresponding to the condition when said operator restraint mechanism is in a restraining condition;

a second switch coupled to said operator search and actuatable between a first state corresponding to the condition when an operator is not present in the seat, and a second state corresponding to the condition when an operator is present in the seat;

an electronic controller coupled to said first and second switches and operable to receive signals from each of said switches, said signals being indicative of the states of each switch or a predetermined combination of the states of said switches, the signal from said first switch being grounded when said operator restraint mechanism is in a non-restraining condition, the signal from said second switch being grounded when said operator restraint mechanism is in a restraining condition and an operator is present in the seat;

said controller outputting a signal to control certain operations of the work machine based upon the signals received from said first and second switches.

\* \* \* \* \*